United States Patent [19]
Kasai et al.

[11] Patent Number: 5,453,470
[45] Date of Patent: Sep. 26, 1995

[54] POLYMERIZATION IN A TUBULAR REACTIVE USING AN ABRADING ELEMENT TO REMOVE SCALE ADHESION

[75] Inventors: Juichi Kasai; Yasuo Kaneko, both of Tokyo; Takashi Nakauma, Aioi; Yutaka Toukai, Tatsuno, all of Japan

[73] Assignee: Showa Highpolymer Co., Ltd., Tokyo, Japan

[21] Appl. No.: 268,562

[22] Filed: Jul. 6, 1994

[30] Foreign Application Priority Data

Jul. 7, 1993 [JP] Japan ................... 5-167758

[51] Int. Cl.$^6$ .......................................... C08F 2/22
[52] U.S. Cl. .................................... 526/64; 526/74
[58] Field of Search ............................. 526/64, 74

[56] References Cited

U.S. PATENT DOCUMENTS

| | | | |
|---|---|---|---|
| 3,595,846 | 7/1971 | Rouzier | 260/89.5 |
| 5,196,489 | 3/1993 | Ballard et al. | 526/64 |

FOREIGN PATENT DOCUMENTS 0168913  1/1986  European Pat. Off. .
3233557  3/1984  Germany .

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

Continuous polymerization method using a tubular continuous polymerization apparatus, wherein a peg 1 for tube cleaning is passed through a polymerization solution in polymerization tube 6 while contacting with the inner wall of the tube during the polymerization. The apparatus used in the method is equipped with polymerization tube 6; a first raw material inlet tube 8 connected with polymerization tube 6; a peg inlet tube 4 connected with polymerization tube 6; a second raw material inlet tube 10 connecting tube 8 with tube 4; valve 5 for opening and shutting between polymerization tube 6 and tube 8; valve 3 for opening and shutting between tube 10 and tube 4; and valve 7 for opening and shutting a connection between the tube 8 and tube 10. The invention can (1) eliminate the washing and cleaning of the polymerization tube at the exchange of species; (2) reduce loss in raw material and time which goes on until the inside of the tube reaches a steady state and (3) prevent scale production on the inner wall of the polymerization tube.

5 Claims, 1 Drawing Sheet

POLYMERIZATION IN A TUBULAR REACTIVE USING AN ABRADING ELEMENT TO REMOVE SCALE ADHESION

BACKGROUND OF THE INVENTION

1Field of the Invention

The present invention relates to a method and apparatus for continuous polymerization. More particularly, it relates to a continuous polymerization method using a tubular continuous polymerization apparatus, in which the washing of a polymerization tube is eliminated, the time-loss when the raw materials of polymerization are changed is reduced and prevention of scale production inside of the polymerization tube becomes possible, and which is related to the continuous polymerization apparatus used therein.

2. Description of the Prior Art

Heretofore, as a method for polymerization of polymeric monomers, the batch polymerization method in which a polymerization reactor equipped with a stirrer, a condenser and so on is used has been widely employed in industry.

On the other hand, even though the continuous polymerization method in which a tubular polymerization apparatus is used has been known to have relatively high productivity, this method still has some problems to be solved, for example, (1) it has been difficult to wash or clean the polymerization tube when raw materials (hereinafter, sometimes referred to as "species") are changed, (2) the loss in raw materials and time generated by the restoration of the solution in the tube to its steady state when species is changed is unavoidable, and (3) particularly in continuous emulsion polymerization, scale is usually produced on the inner wall of the polymerization tube during polymerization and, if accumulated, this scale causes troubles in operation. Therefore, the continuous polymerization method, in fact, is limited in its practical use to only the production of those polymers that barely adhere to the inside of the polymerization tube or to a process in which the polymerization tube can be washed easily using solvents or detergents.

SUMMARY OF THE INVENTION

The object of the present invention is to provide a continuous polymerization method using a tubular continuous polymerization apparatus, in which (1) the washing or cleaning of a polymerization tube is eliminated, (2) loss in time and raw materials of polymerization caused by the restoration of the solution inside the tube to its steady state when the species is changed is reduced and (3) prevention of scale production particularly in the case where scale is produced in a relatively large amount on the inner wall of the polymerization tube such as in continuous emulsion polymerization becomes possible, and to provide the continuous polymerization apparatus used therein.

The present inventors have done extensive studies to solve the problems described above. As the result, they have completed the present invention.

That is, the present invention provides:

(1) a continuous polymerization method for polymerizable monomer(s) using a tubular continuous polymerization apparatus, which is characterized in that a peg for tube cleaning passes through a part or the whole of the polymerization solution in the polymerization tube that is in contact with the inner wall of the tube during polymerization.

A further object of the present invention provides:

(2) the method according to (1) above, wherein the peg for tube cleaning moves forward through the polymerization tube by being pushed by a raw material of the polymerization containing polymeric monomer(s) or a polymerized solution thereof.

Furthermore the present invention aims to provide:

(3) the method according (1) or (2) above, wherein, when the raw material is changed, the peg for tube cleaning is moved forward through the polymerization tube by being pushed by a raw material to be newly used, and at the same time pushes the polymerization solution which was being used before the change out of the tube.

Still further the present invention aims to provide:

(4) the method according to (3) above, wherein the inside of the polymerization tube is maintained at the desired temperature by using a washing medium before the raw material of the polymerization is changed.

Yet further the present invention provides:

(5) the method according to any of (1) to (4) above, wherein the peg for tube cleaning comprises:

a spherical head part which has an outer diameter smaller than the inner diameter of the polymerization tube; and a cleaning part which is flexibly connected with the spherical head part and removes scale while contacting with the inner wall of the polymerization tube.

Further the present invention provides:

(6) the method according to (5) above, wherein the peg for tube cleaning is an integral-type molded article of an elastic material, which comprises:

(i) a spherical head part which has an outer diameter smaller than the inner diameter of the polymerization tube;

(ii) a center part which comprises a cylindrical part having an outer diameter which is approximately the same as the inner diameter of the polymerization tube, of which the back portion is connected and integrated with a trumpet-shaped part widening toward the end for use as a cleaning member;

(iii) a tail part placed behind said center part, which also comprises a cylindrical part having an outer diameter approximately the same as the inner diameter of the polymerization tube, and of which the back portion is connected and integrated with a trumpet-shaped part widening toward the end as a cleaning member; and (iv) a shaft part having an outer diameter smaller than the outer diameter of the head part, which connects the head part, the center part and the tail part in turn.

Furthermore, the present invention provides:

(7) a continuous polymerization apparatus which is equipped with a polymerization tube; a first inlet tube for a raw material for the polymerization which is connected with the Polymerization tube; an inlet tube for the peg for tube cleaning which is connected with the polymerization tube; a second inlet tube for raw material for polymerization which connects the first inlet tube for the raw material with the inlet tube for the peg; a valve for opening and shutting the connection between the polymerization tube and the first inlet tube for the raw material; a valve for opening and shutting the connenction between the second inlet tube for the raw material and the inlet tube for the peg for tube cleaning; and a valve for opening and shutting the connection between the first inlet tube for the raw material and the second inlet tube for sthe raw material.

It has been known to push a peg for pipe cleaning into a non-reaction liquid by using a pressurized wash solution, a pressurized gas or a non-reactive pressurized change solution in order to prevent the contamination of the raw materials during washing of pipe line and the change of materials.

However, the present invention is characterized in that, by making a peg pass through a part or the whole of the polymerization solution" in a continuous polymerization tube where heat exchange is carried out through the tube wall, scale produced during polymerization on the inner wall of the tube can be removed and/or its accumulation on the inner wall of the tube may be prevented in the area the peg passes. This results in preventing a decrease in the heat transfer coefficient of the inner wall of the tube and also eliminates the need to wash and clean the polymerization tube after polymerization.

The operational mode of the present invention is different from the conventional techniques, in which, for example, polymers in the reaction system originating from a polymerization solution adhere to on the inside of the polymerization tube as "scale" in an extremely short time and eventually to block the tube. In the present invention, a peg for tube cleaning is made to pass through the polymerization solution contacting the inner wall of the tube to prevent the adhesion and accumulation of scale, thereby prevent a decrease in the heat transfer coefficient of the inside of the tube, preventing the blockage of the tube and eliminating the washing or cleaning of the tube after polymerization. Accordingly, this mode of operation is novel.

In addition, the technical idea of the preferable mode of the present invention which has not been found in conventional continuous polymerization methods yet in which after the temperature of the inside of the tube has been maintained at the desired temperature by a medium such as a washing solution a peg for tube cleaning is pushed by a raw material containing polymeric monomer(s) or a polymerization solution thereof to push the cleaning medium out of the tube, thus the medium can be changed for a raw material or the polymerization solution and thereby inside of the tube can reach its steady state in a short time. Therefore, this idea is also novel.

DETAILED DESCRIPTION OF THE INVENTION

The present invention will be illustrated in more detail in the following.

The tubular polymerization apparatus of the present invention is here illustrated by taking the case of emulsion polymerization. However, it is needless to say that the present invention is not intended to be limited to emulsion polymerization.

The present invention can be practiced by employing a conventional tubular apparatus for continuous emulsion polymerization which comprises a continuous supply system for emulsions of raw materials such as additive polymeric monomers, emulsifiers, polymerization initiators and water or pre-polymers of the monomers (simply referred to as "emulsion" hereinafter) and a polymerization tube which has a heating and/or cooling function (which is generally a double tube, and in which a heating medium and/or a cooling medium passes through the outer part and the emulsion (polymerization solution) passes into the inner part), with which the force-feed system and the recovery system for the peg for tube cleaning (hereinafter, referred to simply as "peg") and a tube system for force-feeding the emulsion from the back of the peg are provided. In the present invention, the polymerization tube and the tube system through which the peg will be made to pass are preferably sanitary steel tubes, from the viewpoint of smooth movement of the peg and decrease of scale adhesiveness.

Figure 1:
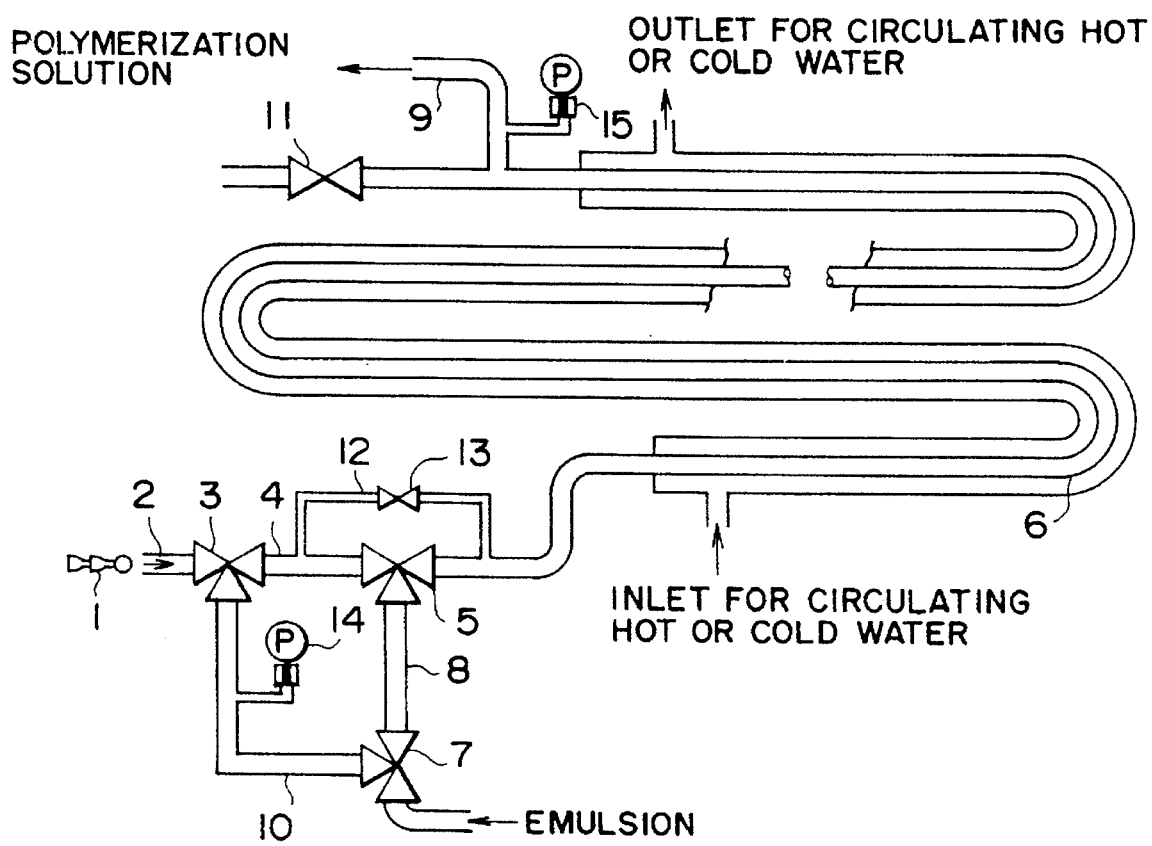
FIG. 1 is a schematic illustration of the tubular continuous polymerization apparatus which can be used in the present invention.

The tubular continuous polymerization apparatus of the present invention is not particularly limited in structure, so long as it is tubular. One embodiment of the continuous polymerization apparatus of the present invention is schematically shown in FIG. 1. The present invention is here illustrated by reference to FIG. 1. However the following embodiment is included merely to aid in the understanding of the present invention, and it is also needless to say that the present invention not intended to be limited to this embodiment.

[Washing the inside of the tube]

(a) A peg 1 for tube cleaning is pushed from its back portion by a medium such as a pressurized gas (e.g. pressurized air or pressurized nitrogen gas) or a pressurized liquid (e.g. pressurized water) from peg inlet 2, by which the peg is introduced into the peg inlet tube 4 through three-way stopcock 3 (hereinafter, simply referred to as "stopcock 3") and set on the back portion of three-way stopcock 5 (hereinafter, simply referred to as "stopcock 5").

(b) A medium, such as water, is fed through threeway stopcock 7 (hereinafter, simply referred to as "stopcock 7")→second raw material inlet tube 10 (hereinafter, simply referred to as "second inlet tube 10)→stopcock 3 into the inner part of polymerization tube 6 (a double tube). While on the other hand, a heating medium and a cooling medium are fed into the outer part of the polymerization tube 6 under predetermined conditions to adjust the inside part of the polymerization tube 6 to the predetermined temperature.

[Starting of continuous polymerization]

(c) An emulsion is fed into the inner part of the polymerization tube 6 through stopcock 7→the second inlet tube 10→the stopcock 3→the peg 1 used in step (a)→ stopcock 5, by which the peg 1 passes through the medium of step (b) in the polymerization tube 6 to discharge the medium used in step (b) from the polymerization solution outlet 9 (hereinafter, simply referred to as "outlet 9"). Subsequently, the emulsion solution passage is switched over to stopcock 7→first inlet tube 8→stopcock 5, where the polymerization proceeds in the polymerization tube 6. The resulting polymer is discharged from the outlet 9.

(d) The peg 1 which passed through the medium of step (c) is recovered from the peg recovery port 11, and then is reset at the back of the stopcock 5 in the same manner as step (a) above. (During this step only, the valve 13 of the bypass 12 remains opened and stopcock 5 is closed.)

(e) When a predetermined time has passed after starting to feed the emulsion of step (c), the path of the emulsion is changed to stopcock 7→second inlet tube 10 → stopcock 3→peg 1 of step (d)→stopcock 5→polymerization tube 6, by which the peg 1 is passed through the polymerization solution to remove the scale adhered to the inside of the polymerization tube or to prevent the production of scale. (At this time, it is preferable to record the differential pressure between the pressure-measuring devices 14 and 15.)

(f) The peg 1 which passed through the polymerization solution is recovered from the recovery port 11.

(g) The path of the emulsion solution is reverted to stopcock 7→first inlet tube 8→stopcock 5.

(h) A peg (which may be the one recovered in step (f) above or a new one) is set on the back portion of the stopcock 5 in the same manner as step (a). (During this step only, is the valve 13 of the bypass 12 left open.)

(i) Subsequently, steps (d) to (h) are repeated at predetermined intervals.

By this method, the prevention of scale adhering to the inner wall of the polymerization tube becomes possible without interrupting the polymerization in the polymerization tube.

In the embodiment described above, the peg once used is recovered and then used again. However, in the polymerization method of the present invention, the required number of previously prepared pegs may be used in turn. Needless to say, an automatic system for continuous supply of pegs and a continuous peg recovery system can be incorporated in the present method.

In the present invention, it is preferable to make the peg pass through the polymerization solution at predetermined time intervals. The term "predetermined time intervals" as used here means that the peg may be made to pass through the polymerization liquid at regular time intervals throughout polymerization or, for example, scheduled time intervals, but rather at longer time intervals during the first half of polymerization and at shorter time intervals during the latter half of polymerization.

After completion of polymerization, a peg set on the back portion of the stopcock 5 is pushed by a washing solution for the pressurized tube (such as water, detergents, e.g. alkaline aqueous solution or solvents). Subsequently, the peg is reset on the back of the stopcock 5, and the peg set is then pushed by a pressurized gas such as pressurized air or pressurized nitrogen gas. By this procedure, the washing solution remaining in the polymerization tube can be completely discharged from the tube.

In addition, for a running change of species, the steps (a) to (c) above may be carried out for the liquid species to be changed, so that a smooth change of species can be carried out without stopping the apparatus.

The peg for tube cleaning to be used in the present invention should have a shape and function by which the inside of the tube is pressed so that the scale adhering thereon is removed by friction or a scraping operation. As the material for the peg, those which have elasticity such as propylene rubber, silicone rubber, nitrile rubber, chloroprene rubber, fluororubber, and the like may be preferably employed.

The peg of the present invention is composed of:

a spherical head part having an outer diameter smaller than the inner diameter of the polymerization tube; and a cleaning part which is flexibly connected with said spherical head part and can remove the scale produced on the inner wall of the polymerization tube while contacting the inner wall.

In more detail, in a preferred embodiment of the present invention, for example, the peg is an integral-type molded article of an elastic material, which is composed of:

(i) a spherical head part having an outer diameter smaller than the inner diameter of the polymerization tube;

(ii) a center part which comprises a cylindrical part having an outer diameter approximately the same as the inner diameter of the polymerization tube, of which the back part is connected and integrated with a trumpet-shaped part widening toward the end as a cleaning member;

(iii) a tail part placed behind said center part, which also comprises a cylindrical part having an outer diameter which is approximatly the same as the inner diameter of the polymerization tube, of which the back part is connected and integrated with a trumpet-shaped part widening toward the end as a cleaning member; and (iv) a shaft part having an outer diameter smaller than the outer diameter of said head part, which connects said head part, said center part and said tail part in turn.

Figure 2:
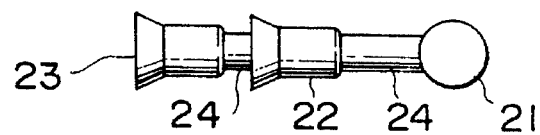
FIG. 2 is a side view of the peg for tube cleaning which can be used in the present invention.

The side view of a preferable embodiment of the peg is shown in FIG. 2.

Since the head part 21 is spherical and has an outer diameter smaller than the inner diameter of the polymerization tube, the peg can move through the polymerization tube smoothly even at bent portions in the tube.

The center part 22 generates a friction force against the inside wall of the tube when it moves through the tube, because of its cylindrical shape and because its outer diameter is approximately the same as the inner diameter of the polymerization tube. In addition, the trumpet-shaped part of the center part 22, when it moves through the tube can press the inside wall of the tube relatively strongly with the part having the maximum outer diameter greater than the inner diameter of the polymerization tube before setting due to its elasticity, resulting in the generation of another frictional force against the inner wall of the tube. With both frictional forces being generated, any scale which has been produced on the inner wall of the tube during polymerization can be scraped off and removed.

The function of the tail part 23 is same as that of the center part 22 in principle. In the tail part 23, however, the friction force against the inner wall of the tube is larger than that in the center part 22. This is because in addition to the elasticity of the tail part itself the pressure applied by a pressurized medium from the back side of the peg is exerted on the inside of the tail part 23 and, therefore, a further pressure is exerted toward the outside (i.e. the inner wall of the tube) on the trumpet-shaped part. As the result, the scale-peeling function of the tail part 23 grows in strength. Accordingly, the tail part 23 not only can remove the scale which was not removed by the center part 22, but it can also remove the scale which has not been removed by the center part 22 so that scale does not remain in the back portion of the peg in the tube.

Also, when the species is changed, mixing of the solution in the front of the peg with the solution in the back of the peg can also be prevented, since the peripheral part of the trumpet-shaped part of the center part 22 and the tail part 23 having the maximum outer diameter press the inner wall of the tube and move through the tube as closing up the gap between the peg and the inner wall of the tube.

As the shaft part 24 is narrower than the other parts of the peg, when the peg turns at a curve of the tube, the shaft part 24 readily bends, thus allowing the peg to pass through the tube relatively smoothly.

For use, as such peg for tube cleaning, "Push-kun" (produced by K. K. Original EG) is commercially available and being put to practical use.

One of the main characteristcs of the present invention is that as a necessary condition of the invention a peg is made to pass through a polymerization solution in the polymerization tube while contacting with the inner wall of the tube. This is because the scale should preferably be removed before the scale adheres to the inner wall during polymerization or at least before the amount of the scale which has adhered accumulates to a point which would make it difficult to scrape. Owing to this characteristic, a decrease in heat transfer coefficient of the inside of the polymerization tube can be prevented, the blocking of the tube can be prevented and the necessity to wash or clean the tube after polymerization can be eliminated.

In one embodiment preferably employed in the present invention, a peg is introduced into the tube after a medium such as a wash solution is passed through the polymerization tube to maintain the temperature of the inside of the tube at a predetermined temperature, and then the peg is pushed by a polymeric monomer-containing raw material or a polymerization solution thereof so that the cleaning medium is pushed out of the tube, thus by the content in the tube can be changed from the medium to the polymerization solution. This is to create a steady state of the reaction species in a short time thus decreasing the loss of the raw material which occurs until the raw material reaches the desired quality, as described above.

In the embodiment description above, the peg is introduced into the tube from the emulsion solution supply port of the polymerization tube. However, in case the peg is used only for the purpose of preventing scale adhesion to the inner wall of the tube during polymerization, it may be introduced from a point somewhere along the tube where scale adhesion is expected. The peg may also be introduced from a plurality of points on the tube.

As the additively polymeric monomers which may be used in present invention, various vinyl-based, olefin-based, vinylidene- and vinylene-based monomers conventionally known can be employed. Examples of such monomers include vinyl esters such as vinyl acetate, vinyl propionate, and vinyl versatate; acrylic acid and methacrylic acid and their esters such as methyl esters, ethyl esters, butyl esters and 2-ethylhexyl esters; acrylonitrile; methacrylonitrile; acrylamide; methacrylamide; ethylene; vinyl halides such as vinyl chloride and vinyl fluoride; vinylidene halides such as vinylidene chloride and vinylidene fluoride; conjugated dienes such as butadiene and isoprene; unsaturated acids such as maleic acid, fumaric acid and itaconic acid and anhydrides thereof; alkyl esters of unsaturated acids such as methyl maleate and methyl fumarate; maleimide acid; and so on. These monomers may be used alone or in combination of two or more.

As the condensation polymeric monomers which may be used in the present invention, there can be employed a combination of amino-based monomers such as melamine, urea and benzoguanamine and formaldehyde (including para-formaldehyde; the same definition is applied to the term "formaldehyde" hereinafter); a combination of phenols and formaldehyde; a combination of organic acids such as isophthalic acid and glycols such as propylene glycol, ethylene glycol, dipropylene glycol and diethylene glycol; and so on. Needless to say the monomers are not limited to the examples described above.

The continuous polymerization method of the present invention can be applied to, for example, addition polymerization methods and condensation polymerization methods.

As the addition polymerization methods to which it can be applied, thermal polymerization methods, photo-polymerization methods, electron-induced polymerization methods and irradiation-induced polymerization methods may be employed, as well as radical polymerization methods in which a conventional radical initiator is used. The continuous polymerization method of the present invention is used most effectively in emulsion polymerization. However, it is also applicable to solution polymerization, aqueous polymerization, non-aqueous dispersion polymerization, and so on. The method of the present invention can also be used in various polymerization methods which are carried out under high pressure or reduced pressure, if the polymerization appratus and the peg-supply system are modified so that they are resistant to pressure or reduced pressure.

In addition, the method of the present invention can be implemented in condensation polymerization methods under the conditions conventionally employed therein.

In the polymerization method of the present invention, any fluid may be used as the fluid to be passed through the polymerization tube, as long as it has fluidity, includes gaseous fluids, liquid fluids, mixtures thereof, and this mixtures of solids and gas and/or liquids.

In addition, the continuous polymerization method of the present invention has few factors that would invite obstacles to polymerization employing forward control or feedback control which can be easily carried out in the conventional continuous polymerization process.

EXAMPLES

The present invention will be illustrated in more detail by the examples below.

In the examples, the polymerization tube (i.e. the inner part of the tube) used in the Examples and Comparative Examples, as shown in FIG. 1, had an inner diameter of 23 mm and a length of 6.15 m (the straight portion of the tube: 5 m, the bent portion of the tube: 1.15 m). As the peg for tube cleaning, the commercially available product "Push-kun" (produced by Kabusikikaisha Original EG), which is made from silicone rubber and is for passing through with an in inner diameter of 23 mm and, as shown in FIG. 2, is composed of the spherical head part 21 (outer diameter: 22.2 mm), the shaft part 24 (outer diameter: 12.5 mm), the center part 22 (outer diameter: 22.2 mm), the tail part 23 (outer diameter: 22.2 mm) and the trumpet-shaped part (outer diameter: 26.2 mm), and of a total length of 77.2 mm was used.

Example 1

The air in a 350-L prepolymerization reactor equipped with a stirrer, a condenser, a thermometer, a nitrogen gas inlet tube and continuous dropping apparatuses for each of a monomer emulsion, an emulsifier aqueous solution and a catalyst aqueous solution, respectively, was replaced with nitrogen gas. Then, into the reactor, were charged 120 kg of hot water (42° C. ), 1.5 kg of "Emulsit 9" (an emulsifier produced by Dai-ichi Kogyo Seiyaku Co., Ltd.), 1 kg of "New Rex Paste H" (an emulsifier produced by Nippon Fat and Oil Corporation), 0.03 kg of sodium sulfate, 2.7 kg of butyl acrylate and 0.28 kg of acrylic acid. The mixture was then heated to 42° C. while stirring at 45 rpm under a nitrogen gas stream. To the resultant mixture, 0.57 kg of 4.3% aqueous hydrogen peroxide and 0.55 kg of 9% ascorbic acid aqueous solution were added. After the induction period, 2 kg of 15% New Rex Paste H aqueous solution was further added. To the resulting mixture, the simultaneous addition by dropping of a monomer emulsion mixture (drop rate: 1 L/min.) composed of 87.3 kg of butyl acrylate, 11.0 kg of acrylic acid, 0.4 kg of New Rex Paste H and 71 kg of hot water (60° C.), 15 kg of 0.6% aqueous hydrogen peroxide (drop rate: 0.075 L/min.) and 7.7 kg of 2.6% ascorbic acid aqueous solution (drop rate: 0.0385 L/min.) was initiated, effecting the emulsion polymerization reaction at a reaction temperature of 53±2° C. After 30 min. from completing the addition of the monomer emulsion mixture, 1.1 kg of 4.3% aqueous hydrogen peroxide was added to the reaction mixture, and the resulting mixture was then maintained at 53±2° C. for 30 min. to complete the polymerization reaction.

In this procedure, 30 min. after starting the addition of said monomer emulsion mixture, the polymerization solution was fed into the continuous polymerization test apparatus of FIG. 1 (outside temperature: atmospheric temperature), which was connected to the prepolymerization reactor, at a flow rate of 17 L/min., and then the polymerization solution discharged from the continuous polymerization apparatus was returned to the prepolymerization reactor. In this manner, the polymerization solution was circulated through the prepolymerization reactor and the continuous polymerization apparatus.

After 10 min. had passed from starting the feed of the polymerization solution into the polymerization tube for testing, a peg for tube cleaning was made to pass through the polymerization solution in the tube every 10 min. by the pressure of the polymerization solution. In this procedure, no obstacles to the passing of the pegs were observed even when the polymerization was completed (i.e., when the polymerization tube was taken apart after completion of polymerization and its inside was visually observed.).

Also, after starting to feed the polymerization solution into the continuous polymerization appratus, the differential pressure between the inlet and the outlet of the tube was measured (i.e. the difference of the pressure measured by the pressure measuring devices 14 and 15). A part of the results are shown in Table 1 below.

As a result, it was found that when the peg passed through the tube, the differential pressure tended to increase with the progress of the polymerization, because of the production of scale. However, after the peg passed through the tube (i.e. during the standard feeding of the polymerization solution), the differential pressure of the polymerization solution changed little throughout the polymerization.

TABLE 1

| Time elapsed after initiating polymerization solution feed (min.) | Differential pressure during standard polymerization solution feed *1 (kg/cm²) | Differential pressure during peg passing *2 (kg/cm²) | Note |
| --- | --- | --- | --- |
| 0 | 0.05 | | |
| 10 | | 0.25 | |
| 30 | | 2.70 | |
| 32 | 0.05 | | |
| 180 | | 3.95 | ← Halt addition of starting materials |
| 182 | 0.05 | | |
| 240 | | 1.60 | ← End of reaction |
| 242 | 0.05 | | |

[Note]
*1: The maximum value of the differential pressure when the the peg did not pass through the polymerization solution.
*2: The maximum value of the differential pressure while the peg passed through the solution.

After completing of the polymerization, the feeding a circulating of the polymerization solution was stopped in the continuous polymerization apparatus, and the polymerization product in the prepolymerization reactor was cooled to 30° C. To the resulting product, 3.7 kg of 28% aqueous ammonia diluted with 7 kg of water was added. As a result, an acrylic resin emulsion having a solid content of 29.9%, a viscosity of 270 cps (30° C., 10 rpm) and pH 6.1 was obtained.

Example 2

In a monomer emulsion mixture preparation vessel, a monomer emulsion mixture was prepared composed of 370 parts by weight of ethyl acrylate, 15 parts by weight of "Sanmol L-320A" (an emulsifier produced by Nikka Chemical Co., Ltd.), 2.6 parts by weight of "New Rex Paste H", 0.5 part by weight of anhydrous dibasic sodium phosphate and 600 parts by weight of water. The temperature of the mixture was adjusted to 70°±1° C., and then was continuously fed into the continuous polymerization apparatus of FIG. 1 (the temperature at the point 0.2 m outside of the inlet was adjusted to 70°±1° C., and 30 min. after this adjustment, the inner temperature of the tube was adjusted to 80°±2° C.), which was connected with the preparation vessel, at a flow rate of 12 L/min. At the same time, 16% ammonium persulfate aqueous solution was continuously fed into the inlet of the polymerization tube for testing. After 10 min. from initiating the feed of the monomer emulsion mixture into the polymerization tube for testing, a peg was made to pass through the polymerization solution in the tube every 7 min. by the pressure of the polymerization solution from the point near the inlet. Even after 4 hours had elapsed, the pegs still continued to pass through the solution smoothly. When the preparation vessel had emptied, 2.56 L of water was charged into the preparation vessel. By pushing a peg with this water, the polymerization solution remaining in the tube was pushed out of the tube and recovered. After completion of the test, the polymerization tube tested was taken apart and its inside were visually observed. As a result, no scale was observed on the inside the tube.

Example 3

The test was carried out in the same manner as Example 2, except for pressing the pegs into the polymerization solution from a position 0.2 m inside of the tube inlet instead of from a position near the inlet. The same results were obtained as in Example 2.

Example 4

In Example 2, when the monomer emulsion mixture preparation vessel had emptied, water was charged into the vessel. In this example, the monomer emulsion mixture described below was charged into the vessel instead of water, as the species to be changed. That is, the peg was pushed by this monomer emulsion mixture to change the polymerization solution remaining in the continuous polymerization tube into this emulsion mixture, whereby the polymerization solution was pushed out of the tube and recovered. At the same time, the polymerization initiators described below were added into the monomer emulsion mixture continuously being changed from a point in front of the tube inlet at the rates described below, respectively, to polymerize the monomer emulsion mixture in the tube. Thereafter, the polymerization was continuously carried out according to the procedures of Example 2.

Through this process, the washing of the polymerization tube, which is usually required during a change of species, could be eliminated. In addition, the polymerization of the changed species could be carried out smoothly, since not only was there no loss in time during the change of species but also because it took little time to change the species.

| Composition of monomer emulsion mixture | |
| --- | --- |
| | (Feed rate: 12 L/min.) part(s) by weight |
| Styrene | 460 |
| Sanmol 210D (produced by Nikka Chemical Co., Ltd.) | 38 |
| New Rex Paste H | 6 |
| Anhydrous dibasic sodium phosphate | 0.2 |
| Water | 450 |
| Polymerization initiators | parts by weight |
| 5% Potassium persulfate aqueous solution (0.4 L/min.) | 37.8 |
| 5% Sodium bisulfite aqueous solution (0.1 L/min.) | 10 |

Example 5

In Example 2, after pushing out the polymerization solution remaining in the polymerization tube with water, the temperature of the water existing in the tube was raised by 2° C. at each part of the apparatus. Then a peg was pushed by the same monomer emulsion mixture as that used in Example 4 to replace the water in the tube with this monomer emulsion mixture. At the same time, the same polymerization initiators as those used in Example 4 were continuously added into the new monomer emulsion mixture from a point in front of the tube inlet at the same rates of addition as those employed in Example 4, to polymerize the monomer emulsion mixture in the tube. Thereafter, the polymerization was continuously carried out according to the procedures of Example 2.

Through this process, the washing step for the polymerization tube, which is usually required during a change of species, could be eliminated. In addition, the polymerization of the new species could be carried out smoothly, since not only was there no loss in time occurring as a consequence of reaction temperature change and went on until the species replaced reached a steady state but also it took little time to change the species.

Comparative Example 1

In Example 1, after 70 min. had elapsed from starting to circulate the reaction solution in the polymerization tube for testing, it was attempted to pass a peg through the reaction solution. However, the peg stopped at a point about 0.6 m inside the inlet of the tube (The adhesion of scale was observed on almost the whole surface of the inside of the tube).

Comparative Example 2

In Example 2, after 60 min. had elapsed after starting to feed the monomer emulsion mixture into the polymerization tube for testing, it was attempted to pass a peg through the reaction solution. However, the peg stopped at a point about 0.7 m inside of the inlet of the tube (The adhesion of scale was observed on almost the whole surface of the inside of the tube).

As described in detail in the Examples and Comparative Examples, in the polymerization of polymeric monomers using a tubular continuous polymerization apparatus by making a peg for tube cleaning pass through a part or the whole of the polymerization tube while contacting with the inner wall of the tube, the following effects can be obtained:

(1) For continuous emulsion polymerization in particular, scale produced on the inner wall of the polymerization tube can be removed readily in the area where the peg passes during polymerization and/or the accumulation of the scale on the inner wall of the tube can be prevented;

(2) The washing or cleaning of the polymerization tube, which is usually required at the exchange of species, can be eliminated or reduced;

In addition, by pushing the peg from the back of the solution to be replaced further into the tube and then making the peg pass through the tube, the following effects can also be obtained:

(3) The loss in time and raw materials, which continue until the species reaches a steady state, can be decreased;

(4) The time required to change species can be reduced.

What is claimed is:

1. A continuous polymerization method for polymerising polymerizable monomers using a tubular continuous polymerization apparatus which comprises polymerizing polymerizable monomers wherein a peg for tube cleaning is passed through a part or the whole of the polymerization solution in a polymerization tube while contacting an inner wall of the tube during the polymerization.

wherein the peg of tune cleaning comprises:

a spherical head part which has an outer diameter smaller than an inner diameter of the polymerization tube; and a cleaning part which is flexibly connected with the spherical head part and removes scale while contracting the inner wall of the polymerization tube.

2. The method according to claim 1, wherein the peg for tube cleaning moves forward through the polymerization tube by being pressed by a raw material for polymerization containing polymerizable monomer(s) or a polymerized solution thereof.

3. The method according to any of claims 1 and 2, wherein, when the raw material of the polymerization is changed, the peg for tube cleaning is moved forward through the polymerization tube by the pressure of a new raw material to be used, and at the same time pushes the polymerization solution which has been used before the exchange out of the tube.

4. The method according to claim 3, wherein the inside of the polymerization tube is maintained at the desired temperature by using a washing medium before the raw material of the polymerization is changed.

5. The method according to claim 1, wherein the peg for tube cleaning is an integral-type molded article of an elastic material, which comprises:

(i) a spherical head part which has an outer diameter smaller than the inner diameter of the polymerization tube;

(ii) a center part which comprises a cylindrical part having an outer diameter approximately the same as the inner diameter of the polymerization tube, of which the back portion is connected and integrated with a trumpet-shaped part widening toward the end as a cleaning member;

(iii) a tail part placed behind the center part, which also comprises a cylindrical part having an outer diameter approximately the same as the inner diameter of the polymerization tube, of which the back portion is connected and integrated with a trumpet-shaped part widening toward the end as a cleaning member; and (iv) a shaft part having an outer diameter smaller than the outer diameter of the head part, which connects the head part, the center part and the tail part in turn.

* * * * *

UNITED STATES PATENT AND TRADEMARK OFFICE
CERTIFICATE OF CORRECTION

PATENT NO.   : 5,453,470
DATED        : September 26, 1995
INVENTOR(S)  : Juichi KASAI, et al.

It is certified that error appears in the above-indentified patent and that said Letters Patent is hereby corrected as shown below:

On the title page, Item [54], and Column 1, Lines 2-4, the title should read:

--POLYMERIZATION IN A TUBULAR REACTOR USING AN ABRADING ELEMENT TO REMOVE SCALE ADHESION--

Signed and Sealed this

Twelfth Day of December, 1995

Attest:

BRUCE LEHMAN

Attesting Officer

Commissioner of Patents and Trademarks